US009492035B2

(12) United States Patent
Pavel et al.

(10) Patent No.: US 9,492,035 B2
(45) Date of Patent: Nov. 15, 2016

(54) CATERING BOX WITH ACTIVE CLIMATE CONTROL FOR TRANSPORTING DELICATE FOOD ITEMS

(71) Applicant: Fish Six RC, San Francisco, CA (US)

(72) Inventors: Michael Pavel, San Francisco, CA (US); Jonathan Kaplan, San Francisco, CA (US); Will Tammen, Redwood City, CA (US); Michael J. Strasser, San Francisco, CA (US); Kyle Lamson, San Francisco, CA (US); Curtis Chow, San Francisco, CA (US); Carrie Eaton, San Francisco, CA (US)

(73) Assignee: FISHSIX RC THE MELT, San Fancisco, CA (US)

( * ) Notice: Subject to any disclaimer, the term of this patent is extended or adjusted under 35 U.S.C. 154(b) by 0 days.

(21) Appl. No.: 14/880,152

(22) Filed: Oct. 9, 2015

(65) Prior Publication Data
US 2016/0029850 A1 Feb. 4, 2016

Related U.S. Application Data

(63) Continuation of application No. 14/508,748, filed on Oct. 7, 2014.

(60) Provisional application No. 62/017,757, filed on Jun. 26, 2014.

(51) Int. Cl.
| | |
|---|---|
| *A47J 37/00* | (2006.01) |
| *A47J 47/14* | (2006.01) |
| *A47J 47/10* | (2006.01) |
| *A21B 3/04* | (2006.01) |
| *F24C 15/32* | (2006.01) |

(Continued)

(52) U.S. Cl.
CPC ............... *A47J 47/145* (2013.01); *A21B 3/04* (2013.01); *A23B 7/148* (2013.01); *A47J 36/2494* (2013.01); *A47J 47/10* (2013.01); *F24C 15/327* (2013.01)

(58) Field of Classification Search
CPC ....... A23B 7/148; A21B 3/04; F24C 15/327; F24C 7/082
USPC .......... 99/468, 467, 470, 476, 474; 219/401, 219/400; 711/104; 426/442, 474, 476
See application file for complete search history.

(56) References Cited

U.S. PATENT DOCUMENTS

| | | | |
|---|---|---|---|
| 5,676,051 A | 10/1997 | Sinemus | |
| 5,872,721 A * | 2/1999 | Huston | A23B 7/148 62/150 |

(Continued)

OTHER PUBLICATIONS

Non-Final Office Action for U.S. Appl. No. 14/508,748, dated Mar. 9, 2016.

*Primary Examiner* — Reginald L Alexander
(74) *Attorney, Agent, or Firm* — Artegis Law Group, LLP

(57) ABSTRACT

A catering box with active climate control is configured to transport "delicate" foods, such as grilled cheese sandwiches, hot dogs, and hamburgers, without inducing substantial sogginess in the bread of those food items. The catering box includes a heat mass configured to retain heat generated by a hot plate and to then radiate that heat, during transport, after the hot plate has been disconnected from a power source. In addition, the catering box includes an exhaust fan that actively controls internal specific humidity levels in order to prevent moisture from settling within the bread of stored food items. A microcontroller within the catering box monitors temperature and absolute humidity levels, computes the current specific humidity level, and then selectively engages or disengages the exhaust fan in response. With his approach, the catering box may limit the degree to which humidity settles within the bread of delicate food items stored within.

18 Claims, 10 Drawing Sheets

(51) Int. Cl.
*A23B 7/148* (2006.01)
*A47J 36/24* (2006.01)

(56) References Cited

U.S. PATENT DOCUMENTS 6,347,578 B1 * 2/2002 Yung .................. A21B 7/005
99/328

6,796,223 B2 * 9/2004 Jiang .................. A23L 3/40
219/400
6,870,136 B1 3/2005 Majordy
7,343,850 B2 * 3/2008 Gerl .................. F24C 15/2007
219/401
8,735,778 B2 * 5/2014 Greenwood ............ F24C 7/082
126/21 A
8,844,432 B2 * 9/2014 Willett .................. A21D 8/025
99/468

* cited by examiner (FRONT VIEW)

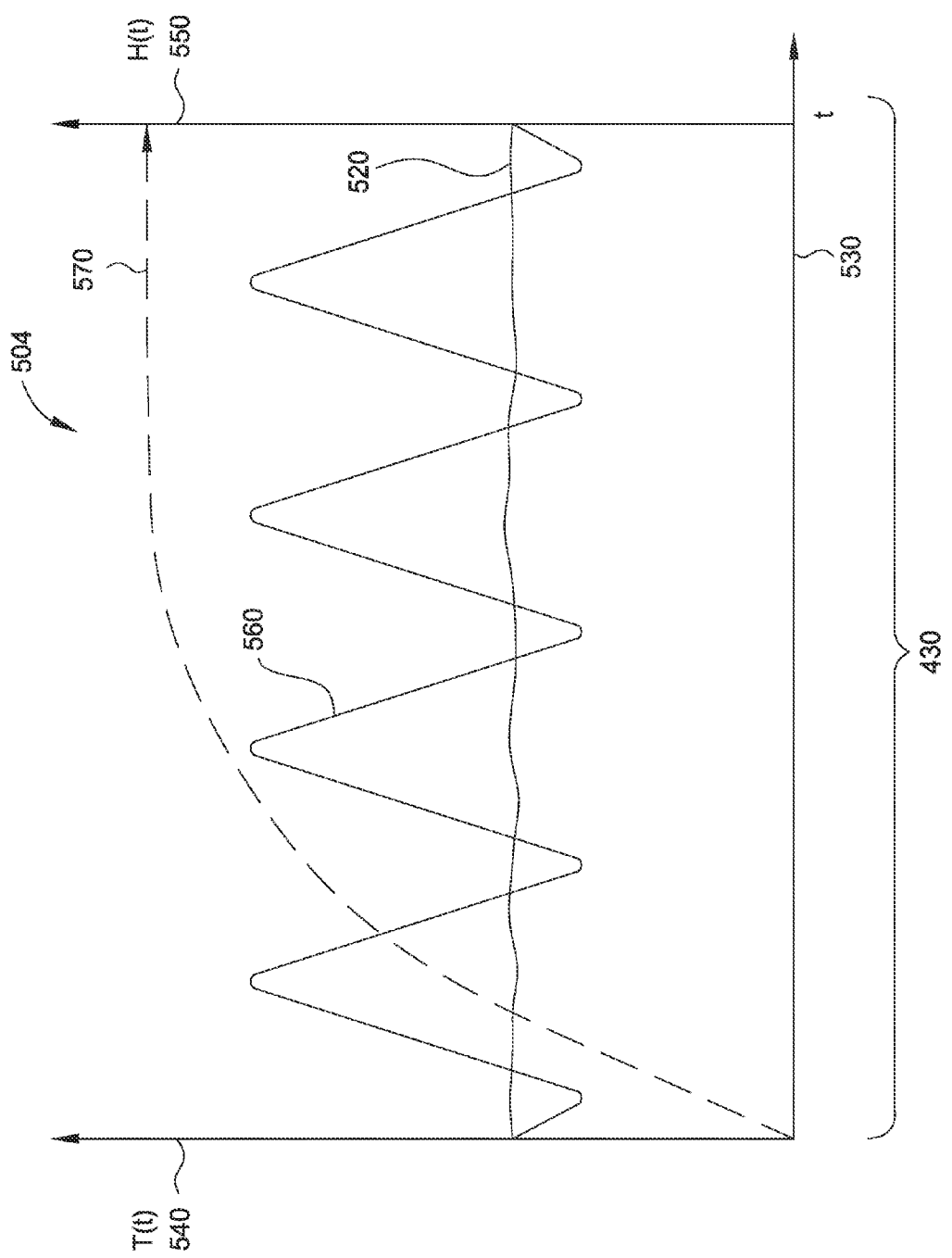

CATERING BOX WITH ACTIVE CLIMATE CONTROL FOR TRANSPORTING DELICATE FOOD ITEMS

CROSS-REFERENCE TO RELATED APPLICATIONS

This application is a continuation of the co-pending U.S. patent application titled, "Catering Box with Active Climate Control for Transporting Delicate Food Items," filed on Oct. 7, 2014 and having Ser. No. 14/508,748, which claims the benefit of United States provisional patent application titled "Catering Box with Active Climate Control for Transporting Delicate Food Items" filed on Jun. 26, 2014 and having Ser. No. 62/017,757. The subject matter of these related applications is hereby incorporated herein by reference.

BACKGROUND OF THE INVENTION

Field of the Invention

Embodiments of the present invention relate generally to food service and, more specifically, to a catering box with active climate control for transporting delicate food items.

Description of the Related Art

The popularity of social gatherings has prompted many restaurants to offer catering service, whereby food items are prepared in bulk quantities and delivered to such gatherings on demand. A social gathering could be, for example, a wedding, a birthday party, a corporate picnic, and so forth. Many different types of restaurants now cater, including conventional sit-down restaurants that allow some or all of the traditional menu items to be catered, catering restaurants that exclusively provide catered food, food trucks capable of acting as both mobile food vendors and catering delivery vehicles, and possibly other types of restaurants. With any such restaurant, catered food items are generally prepared in advance and then loaded into a food container for transport. The food container is then delivered to the locale where the gathering is to take place, and the food items stored within may then be served to guests.

A common type of food container used in the context of catering is known as a "catering box." A conventional catering box is an insulated container that includes a set of internal racks upon which trays of food items may be positioned. The internal racks may be accessed via a door that typically latches shut to seal the food items inside. Once the food items are loaded into the catering box and the door latched shut, the catering box may be transported to the appropriate destination. Catering boxes of the conventional type may be transported via automobile or handcart, be physically carried, or may be transported via other modes of transportation. During transport, the catering box is often subject to a range of different conditions that may adversely affect the temperature and quality of the food items stored within. Such conditions could include, for example, wind, rain, sunshine, snow, extreme temperatures, or simply just the passage of time. For these reasons, conventional catering boxes are typically insulated, as mentioned above, to reduce the extent to which the temperature of the food items changes during transport, thereby allowing those food items to be delivered to consumers with a desirable temperature.

Conventional insulated catering boxes are thus capable of maintaining a slowly varying internal temperature for a given period of time during transport. Therefore, when loaded with warm or hot food items, an insulated catering box is able to maintain a relatively warm internal environment for a short period of time. The catering box thereby allows food items to be transported, within that short time period, without those food items cooling excessively. Although this approach provides one avenue for transporting hot food items, conventional catering boxes suffer from several specific shortcomings that (i) limit the amount of time that certain items may remain stored within such catering boxes and (ii) limit the type of food items that may be transported in such catering boxes.

In particular, the insulation provided by conventional catering boxes is capable of only slowing, but not completely stopping, the transfer of heat out of the catering box and the food items stored therein. Consequently, hot food items stored in a conventional catering box will, after a short time period, cool until thermal equilibrium is reached. Many people find consuming previously hot food items, which have then cooled down, highly undesirable. Furthermore, some types of hot food items, such as grilled cheese sandwiches, cheeseburgers, and other items that include melted ingredients like cheese, lose characteristic attributes once those melted ingredients cool, thereby reducing the desirability of these food items to consumers. For at least these reasons, conventional catering boxes only provide limited usefulness in transporting hot food items.

In addition, the sealed nature of conventional catering boxes, while facilitating heat isolation and retention, locks moisture into the catering box in the form of humidity. Over time, the humidity works its way into the food items stored in the catering boxes. This effect may be harmless (or even advantageous) when the stored food items are impervious to (or improved by) such humidity. However, many types of food items are considered "delicate" in the sense that those items are not impervious to excessive humidity and may, in fact, be spoiled in the presence of moisture, or the humidity may substantially degrade the quality of those food items.

Specifically, bread and other leavened foodstuffs typically absorb moisture, which adversely affects the consistency and texture of those foods. As such, when food items that contain bread are transported in a conventional catering box, those items typically arrive with soggy bread. This problem is magnified by the fact that many bread-containing food items include ingredients that are very moist, such as vegetables, which only add to the internal humidity of the catering box and increase the sogginess of the bread. The problem is further magnified when those food items are hot, since heated, humid air penetrates bread far more readily than cool, moist air.

As the foregoing illustrates, what is needed in the art is a more effective way to transport delicate food items.

SUMMARY OF THE INVENTION

One embodiment of the present invention sets forth a computer-implemented method for adjusting one or more parameters associated with a controlled climate within a catering box, including computing a first humidity value based on sensor data that reflects a current temperature level within the catering box and a current humidity level within the catering box, determining that the first humidity value exceeds an upper humidity boundary, and engaging an exhaust fan configured to remove air from the catering box.

At least one advantage of the techniques set forth herein is that delicate food items may be transported without introducing excessive moisture into the bread of such items. Thus, items such as melts, hamburgers, hot dogs, and so forth may be prepared, transported, and then consumed at a later time, without a significant reduction in quality.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5C illustrate various graphs that depict the internal climate of the catering box of FIGS. 1A-1B across the different operating states, according various embodiments of the present invention;

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

System Overview

Figure 1A:
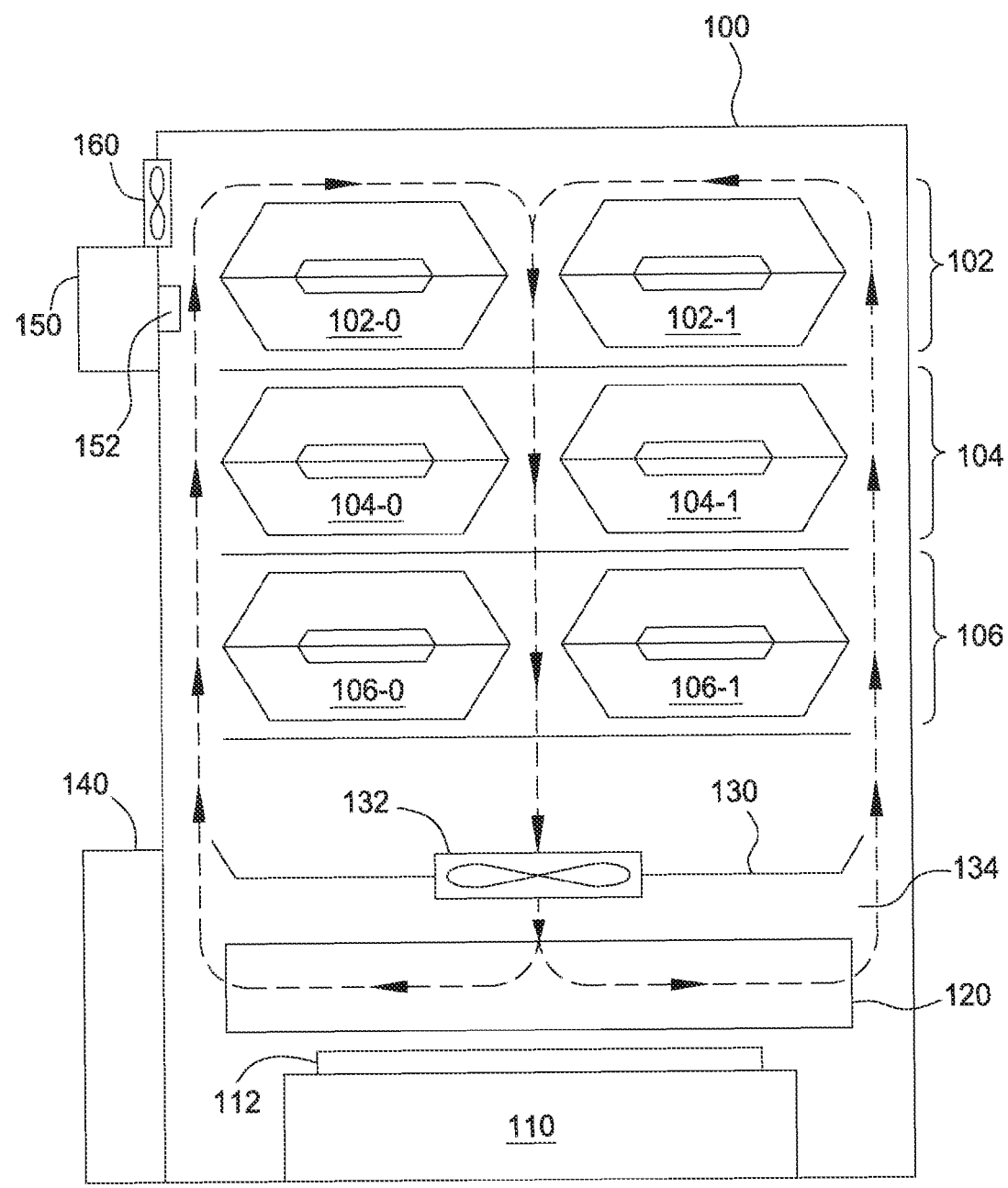
FIGS. 1A-1B illustrate a catering box configured to implement one or more aspects of the present invention.
Figure 1B:
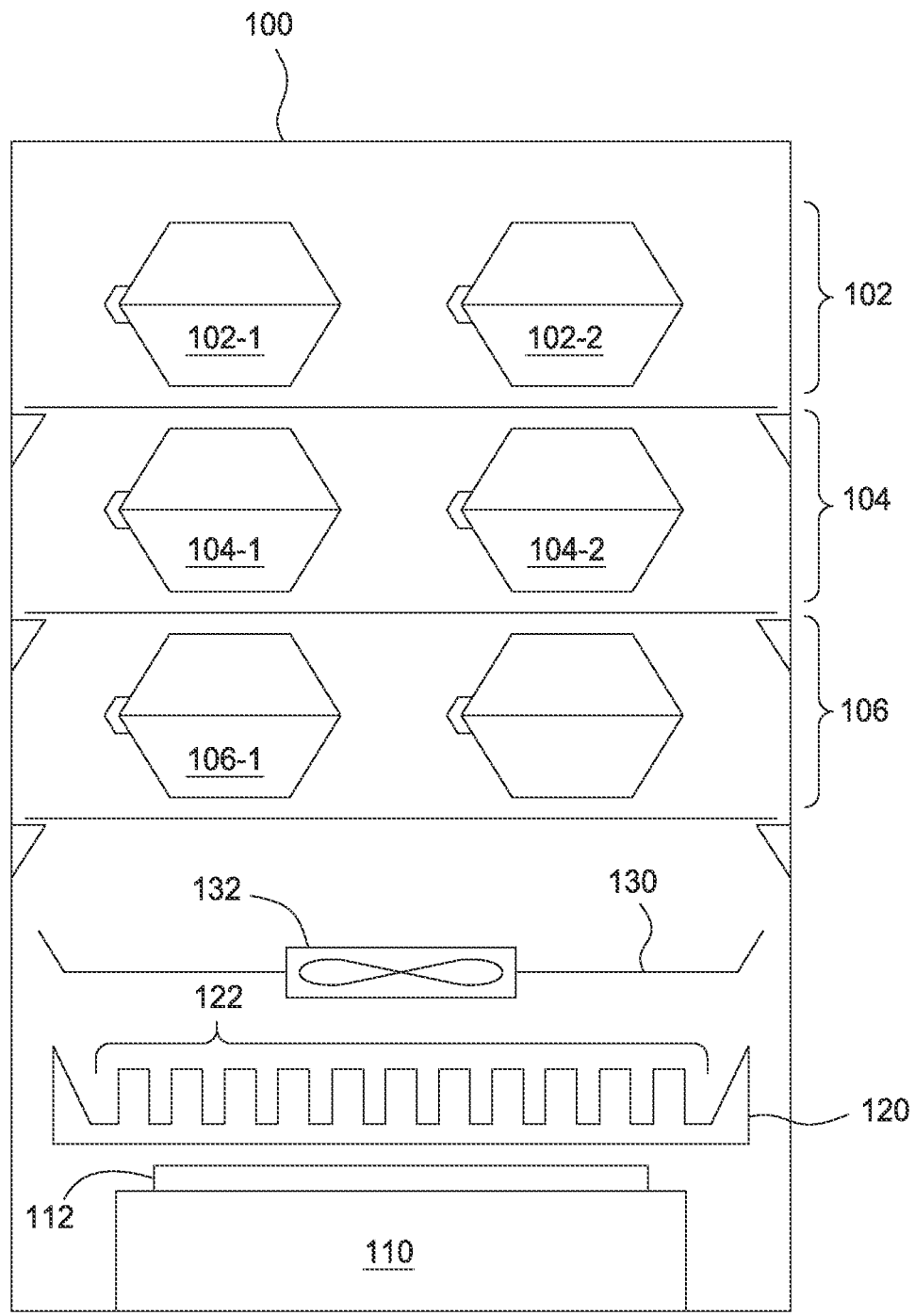

FIGS. 1A-1B illustrate a catering box 100 configured to implement one or more aspects of the present invention. Catering box 100 is an insulated food storage container configured to store prepared food items for later consumption. Catering box 100 may generally be used to transport delicate, heated, food items, from a restaurant, kitchen, or other food preparation facility, to another location, e.g., for catering purposes or food delivery purposes, among other possibilities. In the context of this disclosure, a "delicate" food item generally refers to any food item that includes bread or other ingredients that absorb moisture. FIG. 1A illustrates a side view of catering box 100, while FIG. 1B illustrates a front view of catering box 100.

As shown in FIG. 1A, catering box 100 includes rows 102, 104, and 106 of food containers. Row 102 includes food containers 102-0 and 102-1, row 104 includes food containers 104-0 and 104-1, and row 106 includes food containers 106-0 and 106-1. Each of rows 102, 104, and 106 is associated with a rack within catering box 100 that is configured to physically support and secure the food containers included within the corresponding row.

The food containers within rows 102, 104, and 106 may be any technically feasible enclosure for holding food items, although generally those food containers are insulated clamshell-type containers that (i) maintain separation between the food items stored within and (ii) include ventilation holes to allow hot air to circulate across the stored food items. The aforementioned features (i) and (ii) may keep food items hot during transport, while also preventing humidity from settling within the bread of those food items, potentially maintaining desirable attributes such as crispiness or flakiness during transport. FIGS. 2A-2B and 3A-3B, described in greater detail below, illustrate different exemplary food containers that may store food items within catering box 100.

As also shown, catering box 100 includes a hot plate 110 with heating element 112 coupled thereto, a heat mass 120, a heat shield 130 with circulation fan 132 coupled thereto and configured to induce circulation 134, a battery 140, a microcontroller 150 with sensor array 152 coupled hereto, and an exhaust fan 160. In operation, catering box 100 is initially coupled to an external power source (typically a wall socket) while food items are being loaded. During that time, hot plate 110 draws power from the external power source and causes heating element 112 to increase temperature, thereby causing heat to flow into heat mass 120. Catering box 100 may subsequently be disconnected from the external power source for transport. In some embodiments, catering box 100 and/or heat mass 120 may be preheated before loading of food items occurs.

Figure 5A:
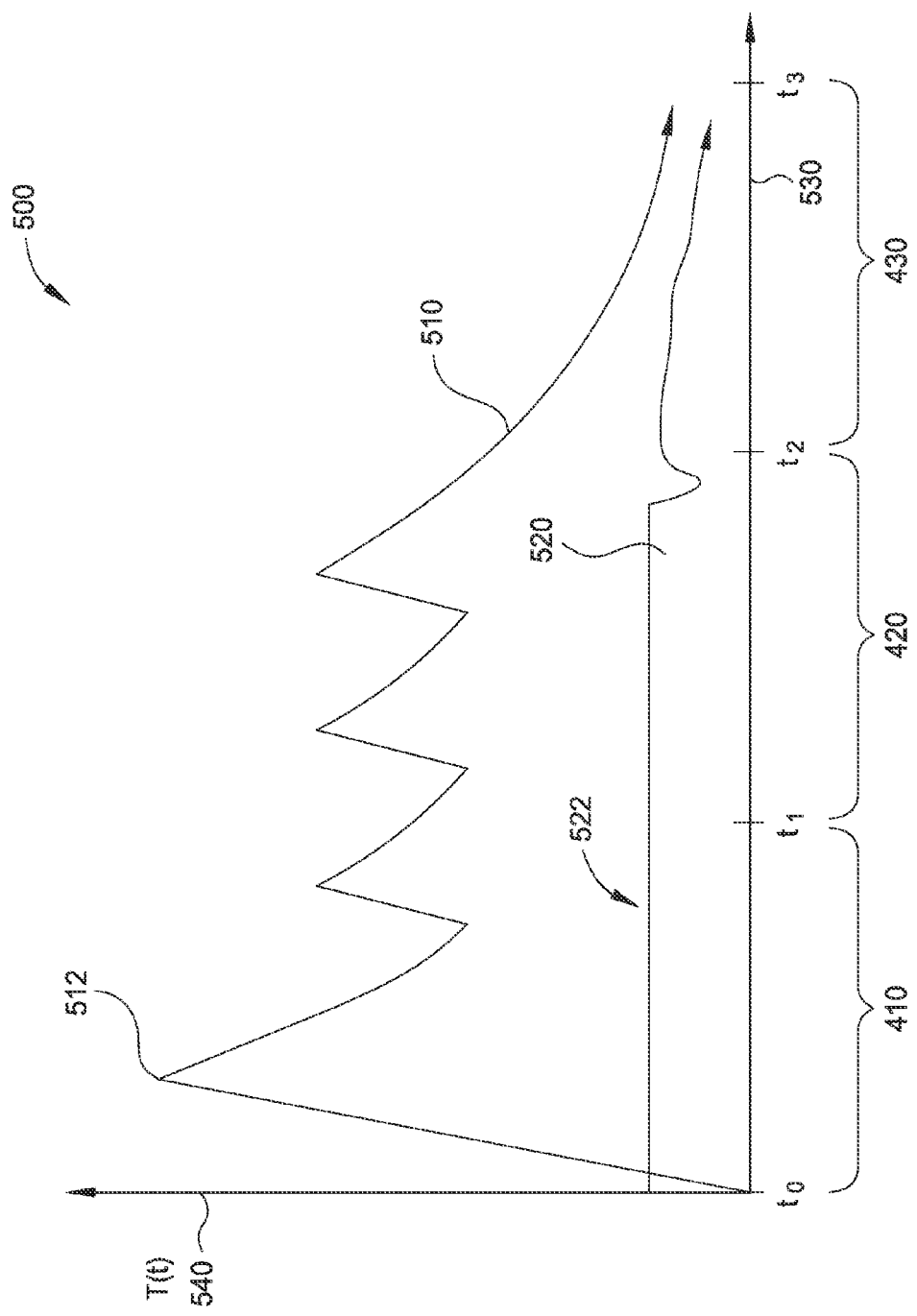
Figure 5B:
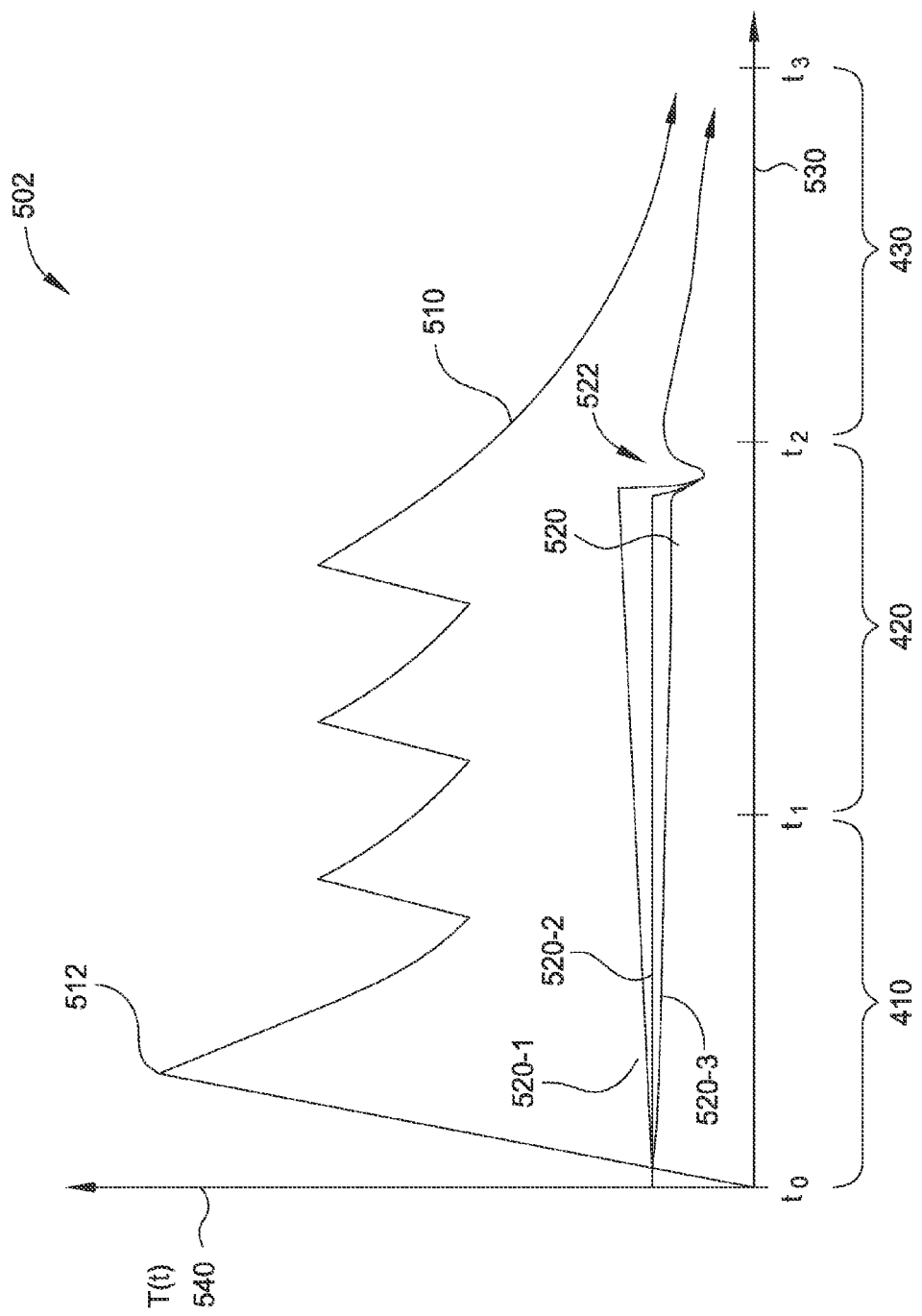

Heat mass 120 is configured to retain and radiate heat within catering box 100 during transport, thereby maintaining an elevated temperature level within catering box 100 and, thus, keeping the food items stored therein hot. Heat mass 120 may be composed of any material, although generally heat mass 120 has a sufficiently high specific heat capacity and/or heat transfer coefficient in order to allow heat mass 120 to retain and radiate heat for a relatively long period of time, e.g., several hours. In one embodiment, hot plate 110, heating element 112, and heat mass 120 may be integrated into a single component configured to generate, retain, and radiate heat. In this embodiment, heating element 112 may be embedded directly into heat mass 120. FIGS. 5A-5B, described in greater detail below, include various graphs that illustrate the temperature of heat mass 120, as well as the internal air temperature within catering box 100, as a function of time.

Heat shield 130 is positioned above heat mass 120 in order to protect nearby food items from excessive heat. Circulation fan 132 is disposed within heat shield 130 and is configured to force air across heat mass 110 to induce circulation 134. Circulation 134 acts as a convective heating current that carries heated air throughout catering box 110, in the fashion shown. When catering box 110 is coupled to the external power source, circulation fan 132 may draw power therefrom. When catering box 100 is disconnected from the external power source for transport, circulation fan 132 may draw power from battery 140.

In one embodiment, heat mass 120 includes heat fins configured to increase the surface area that is exposed to circulation 134, as shown in FIG. 1B. Referring now to FIG. 1B, heat mass 122 includes a set of parallel heat fins 122, as is shown. When circulation fan 132 forces air across heat fins 122, thereby inducing circulation 134, the increased surface area provided by those heat fins allows circulation 134 to convect an increased amount of heat away from heat mass 110 and to then deliver that heat to the food containers stored within rows 102, 103, and 104. Persons skilled in the art will understand that heat mass 120 may have any technically feasible shape configured to influence the rate at which circulation fan 132 causes circulation 134 to convect heat from that heat mass.

Referring back now to FIG. 1A, microcontroller 150 is a computing device that is coupled to hot plate 110 and configured to control the heat output of heating element 112 order to maintain a desired temperature level within catering box 110. In doing so, microcontroller 150 may rely on temperature data supplied by sensor array 152. Sensor array 152 may include one or more temperature sensors, as well as other types of sensors described below. In some embodiments, catering box 100 includes multiple sensor arrays disposed on various internal locations, including, for example, within heat mass 120. In such embodiments, sensor data may be gathered to avoid overheating. Microcontroller 150 is configured to process temperature data gathered by sensor array 152 and to selectively activate or deactivate hot plate 110 in order to bring the internal temperature of catering box 110 towards the desired temperature level.

Microcontroller 150 is also coupled to circulation fan 132 and configured to control the speed of that fan in order to maintain a particular level of convective heating associated with circulation 134. In doing so, microcontroller 150 may rely on airspeed data supplied by sensor array 152. In one embodiment, sensor array 152 may include a wind speed sensor, such as, e.g., an anemometer, that is configured to measure the strength of circulation 134. Microcontroller 150 is configured to process wind speed data gathered by sensor array 152, as well as temperature data, and to selectively activate or deactivate circulation fan 132 in order to maintain a desired level of convective heating.

Microcontroller 150 is also coupled to exhaust fan 160 and configured to control the speed of that fan in order to maintain a particular level of specific humidity within catering box 100. As is known in the art, "specific humidity" may be computed based on a relative humidity measurement and a temperature measurement or may be approximated based on those measurements along with a pressure estimate. Generally, specific humidity represents a ratio between the mass of water vapor suspended in a unit area of air and the total mass of that unit area of air. In one embodiment, sensor array 152 may include a combined temperature and humidity sensor, and microcontroller 150 may rely on data provided by those sensors in order to compute the specific humidity level within catering box 100. Based on the current specific humidity level, microcontroller 150 may engage exhaust fan 160 in order to reduce the specific humidity level when the internal temperature of catering box 100 is high, or disengage exhaust fan 160 in order to allow the specific humidity level to rise when the internal temperature of catering box 100 is low.

In various embodiments, microcontroller 150 is configured to implement a temperature-dependent humidity algorithm in order to compute humidity instead of computing specific humidity. Persons skilled in the art will understand that the computation of specific humidity versus humidity may be interchanged without departing from the scope and spirit of the present invention.

Microcontroller 150 generally maintains the specific humidity within catering box 100 between a lower bound of 3% and an upper bound of 4%. Beneath the lower bound, delicate food items stored within catering box 100 may become too dry, while above the upper bound, those food items may become too moist and potentially soggy. As such, microcontroller maintains the specific humidity inside catering box 100 within the potentially narrow range established by those bounds.

The lower and upper bounds mentioned above are configurable and may be changed based on the type of food items stored. For example, food items that include vegetables typically introduce moisture into bread faster than food items that do not contain vegetables, and so in cases where catering box 100 stores food items that include vegetables, microcontroller 150 could maintain the specific humidity within catering box 100 between 2% and 3%, potentially decreasing moisture retention within bread. Microcontroller 150 may be preconfigured with default lower and upper bounds, and those values may then be adjusted based on the type of food items to be stored. The upper and lower bounds may also be configured when catering box 100 is loaded depending on the order to be placed within catering box 100. In one embodiment, microcontroller 150 is configured to compute precise upper and lower bounds based on the expected humidity contribution from each food item to be stored in catering box 100.

Regardless of the exact values of the lower and upper bounds mentioned above, microcontroller 150 may deactivate exhaust fan 160 when the specific humidity falls below the lower bound, and activate exhaust fan 160 when the specific humidity surpasses the upper bound, thereby maintaining a specific humidity level inside catering box 100 that falls within the range established between the aforementioned bounds. One approach or controlling exhaust fan 160 in this manner is described in stepwise fashion below in conjunction with FIG. 7.

Ventilated Food Containers for Use in a Catering Box

Figure 2A:
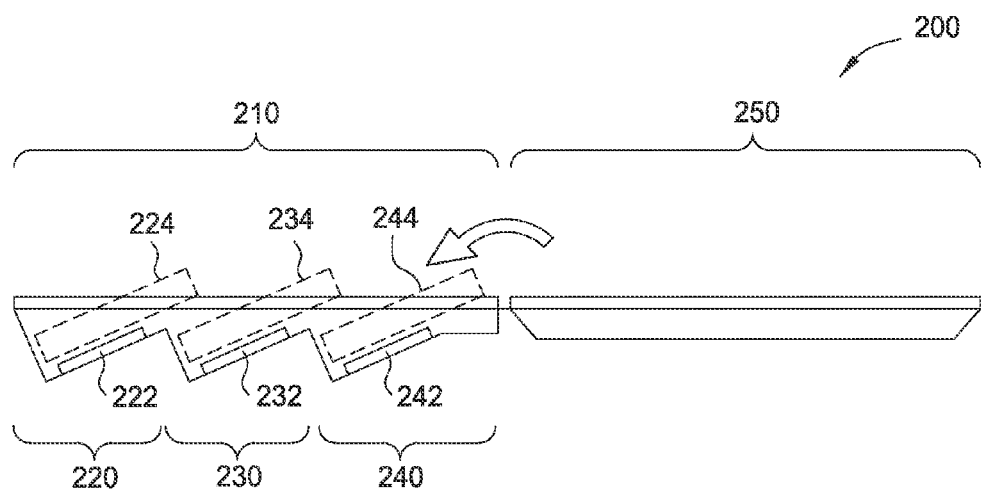
FIGS. 2A-2B illustrate a first food item container configured to provide ventilation for multiple food items stored within, according to one embodiment of the present invention.
Figure 2B:
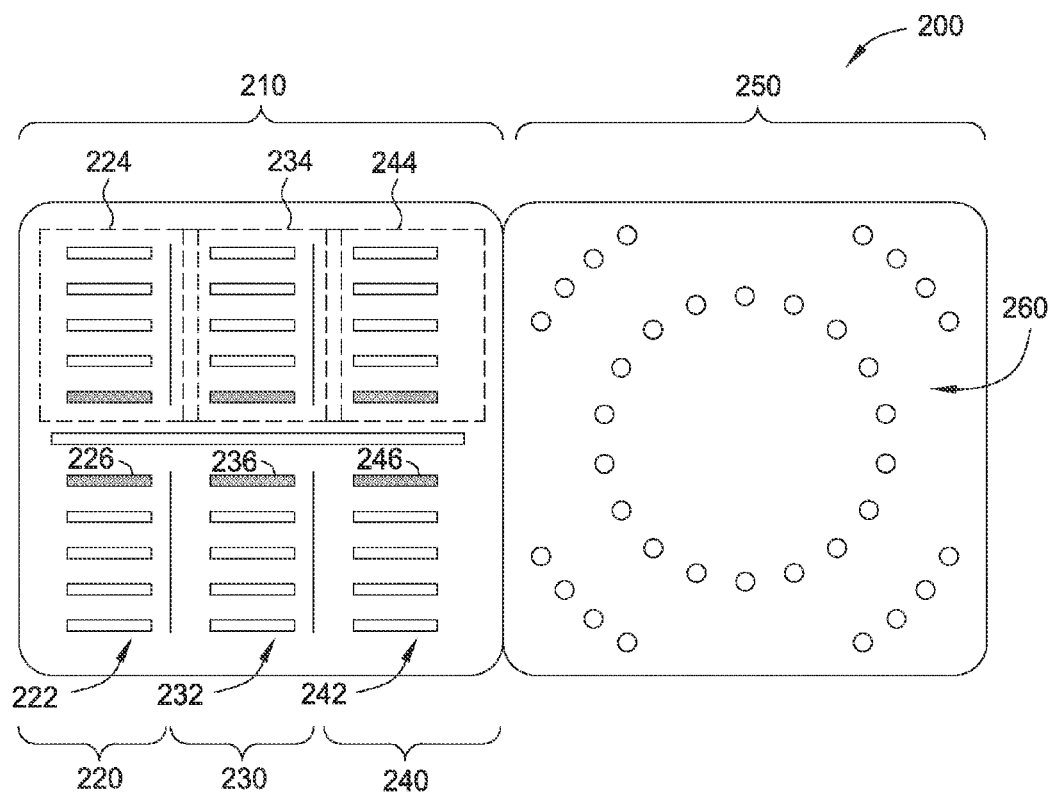

FIGS. 2A-2B illustrate a first food item container configured to provide ventilation for multiple food items stored within, according to one embodiment of the present invention. As shown, a food item container 200 includes a food storage section 210 and a lid section 250. Food storage section 210 is configured to store food items, while lid section 210 is configured to open to allow those food items to be placed within, and to then close in order to secure and protect those food items.

Food storage section 210 includes multiple angled support surfaces 220, 230, and 240. Each angled support surface includes a set of support ridges. As shown, angled support surface 220 includes ridges 222, angled support surface 230 includes ridges 232, and angled support surface 240 includes ridges 242. Each angled support surface is configured to support one or more food items configured to rest on the corresponding set of ridges. Angled support surface 220 is configured to store food item 224 on ridges 222, angled support surface 230 is configured to store food item 234 on ridges 232, and angled support surface 240 is configured to store food item 244 on ridges 242. In one embodiment, the ridges discussed herein are taller compared to conventional ridges for supporting food items.

The angled nature of the angled support surfaces, as shown in FIG. 2A, allows multiple food items to be packed together within food item container 200 while maintaining a certain amount of separation between those food items. That separation allows air to circulate around the food items within food container 200, limiting the extent to which humidity settles with those items. The set of ridges associated with each angled support surface reduces the total surface area placed in contact with the bottom of each food item, furthering the degree to which air circulates around and underneath those food items and potentially limiting the amount of humidity that settles therein. In addition, food storage section 210 and lid section 250 alike include ventilation holes that allow circulation 134, described above in conjunction with FIGS. 1A-1B, to pass through food item container 200. These ventilation holes are shown in FIG. 2B.

Figure 3A:
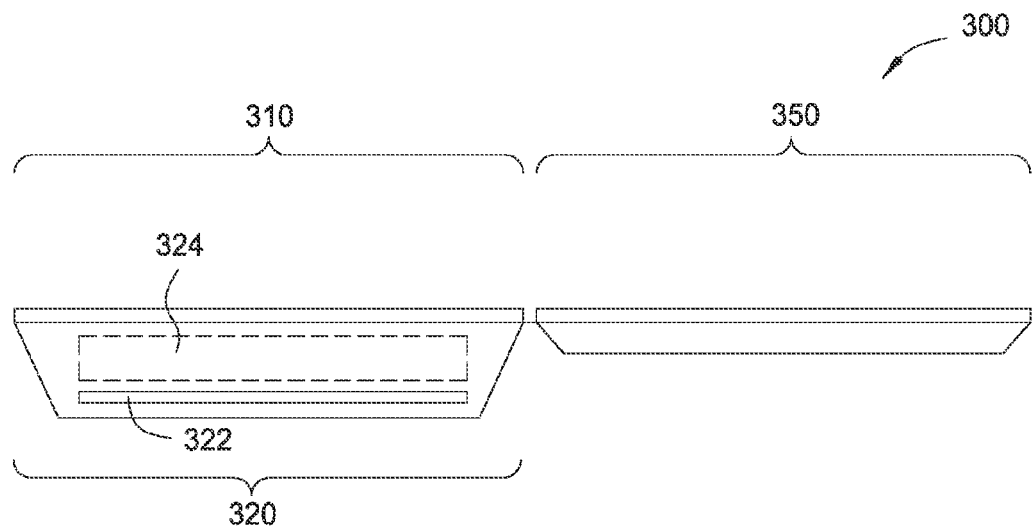
FIGS. 3A-3B illustrate a second food item container configured to ventilate a single food item stored within, according to another embodiment of the present invention.
Figure 3B:
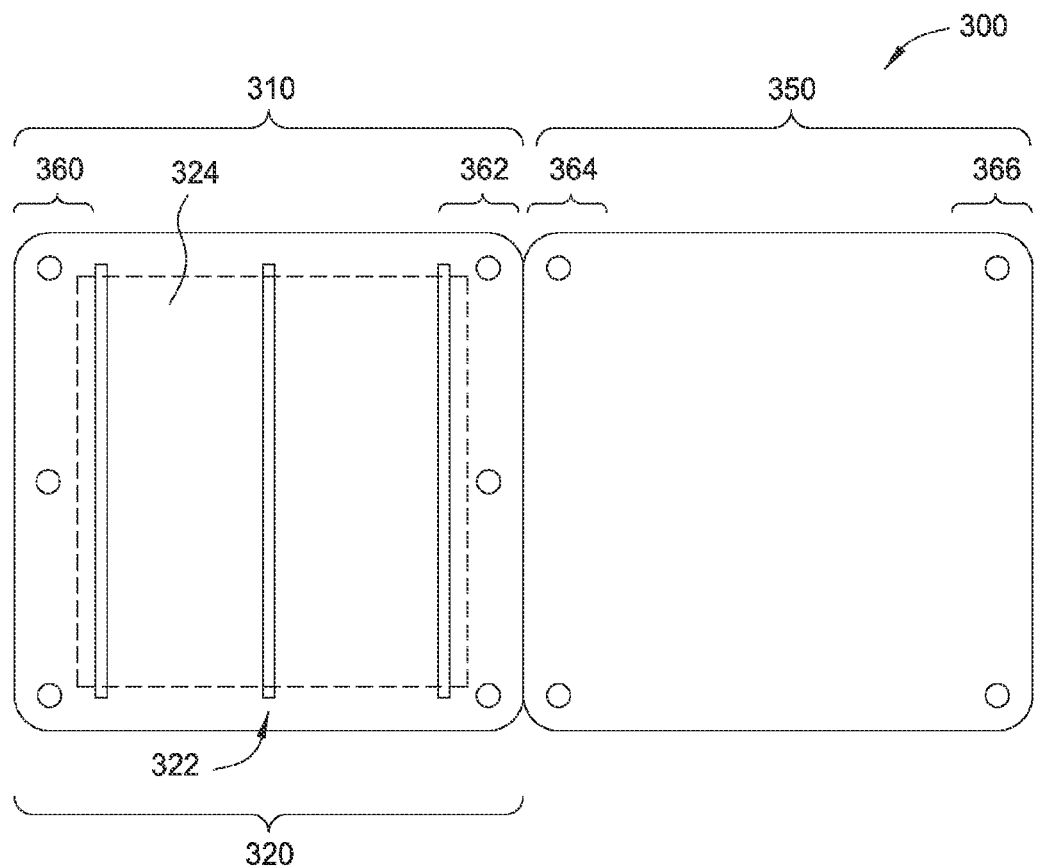

In FIG. 2B, food storage section 210 of food storage container 200 includes ventilation holes 226, 236, and 246 within angled support surfaces 220, 230, and 240, respectively. In one embodiment, each ventilation hole has a substantially similar profile as one of the ridges within the same angled support surface, as is shown. In addition, lid section 250 includes ventilation holes 260 that could be arranged, for example, in a circular pattern. Since food storage section 210 and lid section 250 alike include ventilation holes, circulation 134 is capable of entering through ventilation holes 160, traversing food items 224, 234, and 244, and then exiting food container 200 via ventilation holes 226, 236, and 246, in like fashion as shown in FIG. 1B. In this manner, circulation 134 may carry humidity away from those food items, thereby limiting the degree to which moisture can settle into those food items. With this approach, the desired consistency of bread included in food items 224, 234, and 244 may be preserved, and sogginess may be limited. FIGS. 3A-3B illustrate another exemplary food item container, described in greater detail below.

FIGS. 3A-3B illustrate a second food item container configured to provide ventilation for a single food item stored within, according to another embodiment of the present invention. As shown, a food item container 300 includes a food storage section 310 and a lid section 350, similar to that shown in FIGS. 2A-2B. However, in FIGS. 3A-3B, food storage section 310 is configured to store only one food item. Lid section 310 is configured to open to allow the food item to be placed within, and then closed in order to secure and protect that food item.

Food item container 300 includes a support surface 320 that includes ridges 322 configured to support food item 324. In one embodiment, ridges 322 are taller compared to conventional ridges for supporting food items. Similar to food container 200, ridges 322 are configured to elevate food item 324 away from support surface 320, thereby allowing air to circulate around and underneath food item 324 and reducing the extent to which humidity settles into that food item. Food item container 300 includes ventilation holes within food storage section 310 and lid section 350 that facilitate circulation 134 passing across food item 324, as shown in FIG. 1B.

In FIG. 3B, food storage section 310 includes sets of ventilation holes 360, 362, 364, and 366. Like food item container 200, the placement of ventilation holes 360 and 362 within food storage section 310, in combination with the placement of ventilation holes 364 and 366 on lid section 350, allows circulation 134 to pass through food item container 300 when that container is closed, in like fashion as shown in FIG. 1B. In this manner, circulation 134 may carry humidity away from food item 324, thereby limiting the degree to which moisture can settle therein and maintaining a particular bread consistency.

Referring generally to FIGS. 2A-3B, persons skilled in the art will recognize that the food item containers discussed herein are provided for exemplary purposes only, and not meant to limit the scope of the present invention. As such, catering box 100 may implement any type of food item container while operating in the fashion described above in conjunction with FIGS. 1A-1B. In operation, catering box 100 is configured to function according to a particular sequence of operating states, as described in greater detail below in conjunction with FIG. 4.

Catering Box Operating States

Figure 4:
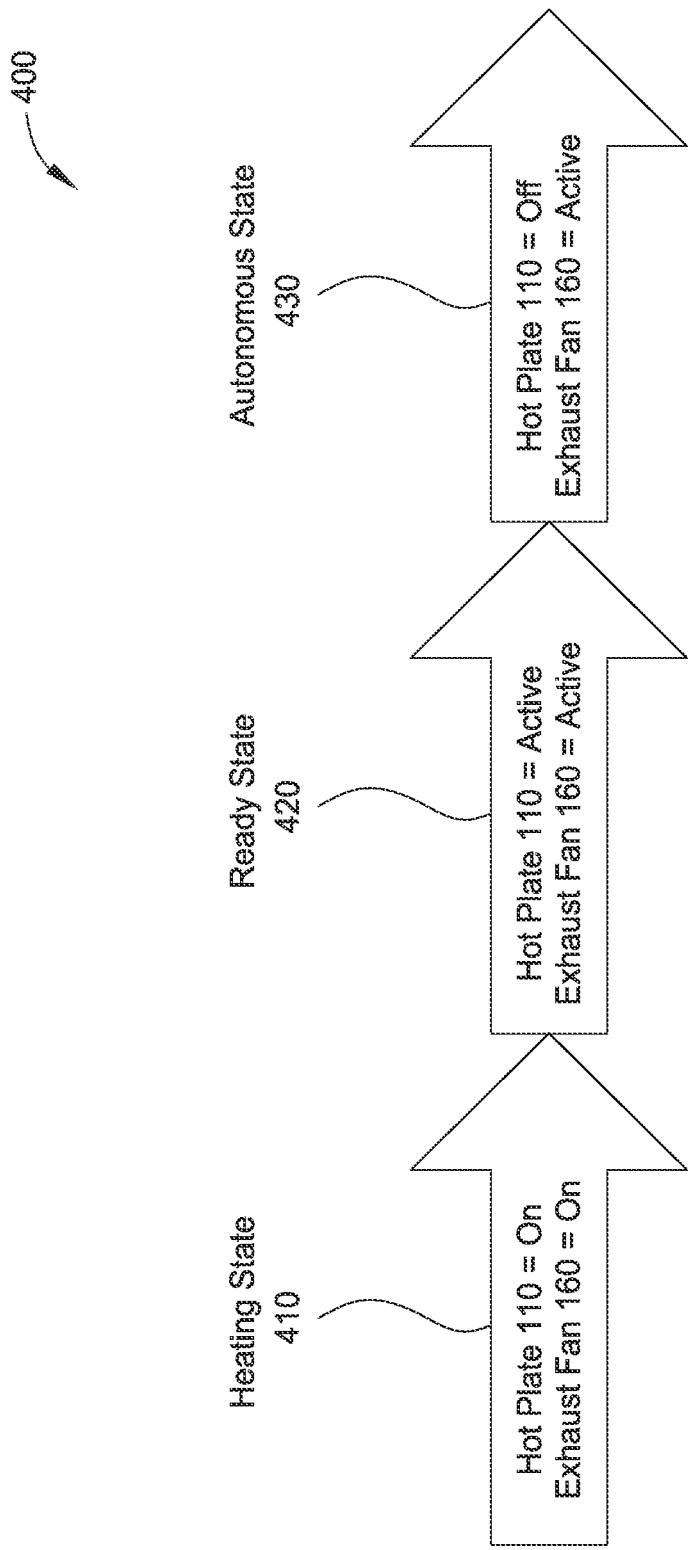
FIG. 4 is a state transition diagram that illustrates a sequence of operating states implemented by the catering box of FIGS. 1A-1B, according to one embodiment of the present invention.

FIG. 4 is a state transition diagram that illustrates a sequence of operating states implemented by catering box 100 of FIGS. 1A-1B, according to one embodiment of the present invention. As shown, sequence 400 of operating states includes a heating state 410, a ready state 420, and an autonomous state 430. Sequence 400 reflects a typical use-case for catering box 100. In this typical use case, catering box 100 is prepared to be loaded with food items while operating in heating state 410, is loaded with food items while operating in ready state 420, and then physically transported, along with the loaded food items, while operating in autonomous state 430. Microcontroller 150 is generally configured to coordinate the different operating states mentioned above by controlling the various components of catering box 100, as described in greater detail below.

Microcontroller 150 typically places catering box 100 into heating state 410 at the restaurant, kitchen, or other food preparation site where food items are being prepared. Generally, heating state 410 may be implemented whenever catering box 100 is plugged into a wall socket. In order to implement heating state 410, microcontroller 150 places both hot plate 110 and exhaust fan 160 into an "on" state, meaning that both hot plate 110 and exhaust fan 160 are continuously operational. In this state, hot plate 110 brings the temperature of heat mass 110 up to a maximum value, while exhaust fan continuously removes humidity from catering box 100. In one embodiment, exhaust fan 160 is deactivated during heating state 410 or cycled between "on" and "off" states. Once the temperature of heat mass 110 reaches that maximum value, as measured by sensory array 152, microcontroller 150 then transitions catering box 100 from heating state 410 into ready state 420.

When operating in ready state 420, microcontroller 150 causes both hot plate 110 and exhaust fan 160 to actively cycle between "on" and "off" states to maintain a specific average temperature level and a particular specific humidity level. In one embodiment, microcontroller 150 cycles hot plate 110 between the "on" state and the "off" state over specific intervals. For example, microcontroller 150 could turn hot plate 110 on for two minutes, and once two minutes has elapsed, turn hot plate 110 off for four minutes. Once the four-minute interval has elapse, microcontroller 150 could again turn hot plate on for two minutes. In this fashion, microcontroller 150 effects a temperature maintenance cycle in order to sustain the internal air temperature within catering box 100 at close to a specific level. Microcontroller 150 may implement this temperature maintenance cycle based on readings from one or more temperature sensors associated with sensor array 152.

In addition, when operating in ready state 420, microcontroller 150 causes exhaust fan 160 to cycle between an "on" and an "off" state periodically in order to maintain the specific humidity within catering box 100 between certain upper and lower bounds, in the manner discussed above in conjunction with FIGS. 1A-1B. In practice, the upper bound may be 4%, while the lower bound may be 3%, although persons skilled in the art will understand that these values are variable and, potentially, configurable by the user of catering box 100. As also mentioned above, microcontroller 150 is configured to engage exhaust fan 160 when the measured specific humidity level exceeds the upper bound, and then disengage exhaust fan 160 when the measured specific humidity level falls below the lower bound. In this manner, microcontroller 150 maintains a desired specific humidity level within catering box 100.

Once catering box 100 is loaded with various food items, typically stored within a food container such as those shown in FIGS. 2A-3B, catering box 100 may be unplugged from the wall socket and readied for transport. When catering box 100 is unplugged, microcontroller 150 effects a transition from ready state 420 to autonomous state 430. When operating in autonomous state 430, hot plate 110 may be off and exhaust fan 160 may continue to regulate internal specific humidity in similar fashion as described in conjunction with ready state 420.

Since heat mass 120 absorbed heat from hot plate 110 during heating state 410 and ready state 420, when catering box 100 enters autonomous state 430, heat mass 120 simply radiates the absorbed heat, thereby keeping the internal temperature of catering box 100 at a relatively high level for an extended period of time. The radiation of heat mass 120 allows catering box 100 to be transported, over potentially long distances and/or for extended periods of time, while keeping the food items stored therein hot. Simultaneously, exhaust fan 160 performs specific humidity maintenance to preserve the specific humidity within catering box 100 at desirable levels. As such, when catering box 100 arrives at the intended destination, the food items stored therein are typically hot, and any bread associated with those items may not be soggy.

Although sequence 400 of operating states reflects one set of transitions associate with a typical use case, microcontroller 150 may also implement transitions between operating states, and potentially other additional operating states, not explicitly discussed above. For example, when catering box 110 arrives at the intended destination, catering box 100 could be plugged into a wall socket once again, at which time microcontroller 150 would transitions catering box 100 from autonomous state 430 back to heating state 410. Once heating state 410 is complete (the maximum temperature of heat mass 120 is reached), microcontroller 150 may then transition catering box 100 to ready state 420. Catering box 100 could remain in ready state 420 for any amount of time, and could remain in that state while food items are extracted and served.

Further, microcontroller 150 could implement various error states to suspend the operation of any of the components included in catering box 100. For example, upon detecting issues with hot plate 110, catering box 100 could enter an error state where hot plate 110 is off, yet exhaust fan 160 continues to evacuate humid air, as needed, to maintain the desired specific humidity range. The various operating states discussed above, and exemplary sensor readings gathered during those operating states, are discussed in greater detail below in conjunction with FIGS. 5A-5C.

FIGS. 5A-5C illustrate various graphs that depict the internal climate of the catering box of FIGS. 1A-1B across the different operating states, according various embodiments of the present invention. As shown in FIG. 5A, graph 500 includes a plot of heat mass temperature 510 as a function of time and a plot of air temperature 520 within catering box 100 as a function of time. A sensor coupled to heat mass 120 may measure temperature 510 over time, while one or more internal air temperature sensors may measure air temperature 520 over time. Heat mass temperature 510 and air temperature 520 are plotted against time axis 530 and temperature axis 540.

Time axis 530 is divided into three time periods that correspond to the operating states discussed above in conjunction with FIG. 4. As shown, a first time period t0 to t1 corresponds to heating state 410, a second time period t1 to t2 corresponds to ready state 420, while a third time period t2 to t3 corresponds to autonomous state 430.

During heating state 410, hot plate 110 constantly heats heat mass 120 until heat mass reaches maximum temperature 512. At that point, microcontroller 150 transitions catering box 100 from heating state 410 to ready state 420 in the manner described above. During ready state 420, microcontroller 150 cycles hot plate 110 between "on" and "off" states, so that heat mass 120 effectively maintains the range of temperatures shown during ready state 420.

During ready state 420, food items may be loaded into catering box 100. When microcontroller 150 transitions catering box 150 from ready state 420 to autonomous state 430, thereby removing power from hot plate 110, air temperature 520 may experience a dip 522. However, circulation fan 132 induces circulation 134, which tends to equalize the internal air temperature of catering box 100, as shown in FIG. 5B.

Referring now to FIG. 5B, as shown, prior to time t1, air temperature 520 is separated into three separate air temperature readings, air temperature 520-1, 520-2, and 520-3. These different air temperature plots are displayed on graph 502, which represents an extension of graph 500 shown in FIG. 5A. Air temperatures 520-1, 520-2, and 520-3 may be gathered from different air temperature sensors within catering box 100 that reside at different positions. Prior to microcontroller 150 transitioning to autonomous state 430, the different air temperatures 520-1 through 520-3 diverge from one another, indicating an unequal distribution of air temperatures within catering box 100, as is shown. However, once circulation fan 132 induces circulation 134, air temperatures 520-1, 520-2, and 520-3 converge to air temperature 520, as also shown.

Referring generally to FIGS. 5A and 5B, once catering box 100 is readied for transport, catering box 100 may be unplugged, at which point microcontroller 150 turns hot plate 110 off and transitions to autonomous state 430. During autonomous state 430, heat mass 120 slowly cools over time, radiating heat into the internal chamber of catering box 100 and keeping the food items stored therein relatively hot. In addition, exhaust fan 160 periodically cycles on and off, thereby maintaining a desired specific humidity level, a described in greater detail below in conjunction with FIG. 5C.

As shown in FIG. 5C, a graph 504 includes a plot of air temperature 520 as a function of time (similar to graphs 502 and 504) as well as a plot of specific humidity 560 as a function of time. Air temperature 520 is plotted relative to time axis 530 and temperature axis 540, as before, while specific humidity 560 is potted relative to time axis 530 and specific humidity axis 550. For a given air temperature level reflected by air temperature 520, specific humidity 570 oscillates between a lower bound and an upper bound, which in some cases, could be, e.g., 3% and 4%, respectively. Exhaust fan 160 is configured to maintain specific humidity within these bounds in response to control signals generated by microcontroller 150. Microcontroller 150, in turn, reads temperature and humidity sensor data and computes the current specific humidity level. Then, based on whether that computed value exceeds the upper bound or falls beneath the lower bound, microcontroller 150 engages or disengages exhaust fan 160, respectively. In various other embodiments, microcontroller 150 may modulate the speed of exhaust fan 160 in order to maintain a predetermined specific humidity level, or use a predictive algorithm to adjust a humidity threshold (similar to a thermostat).

Figure 6:
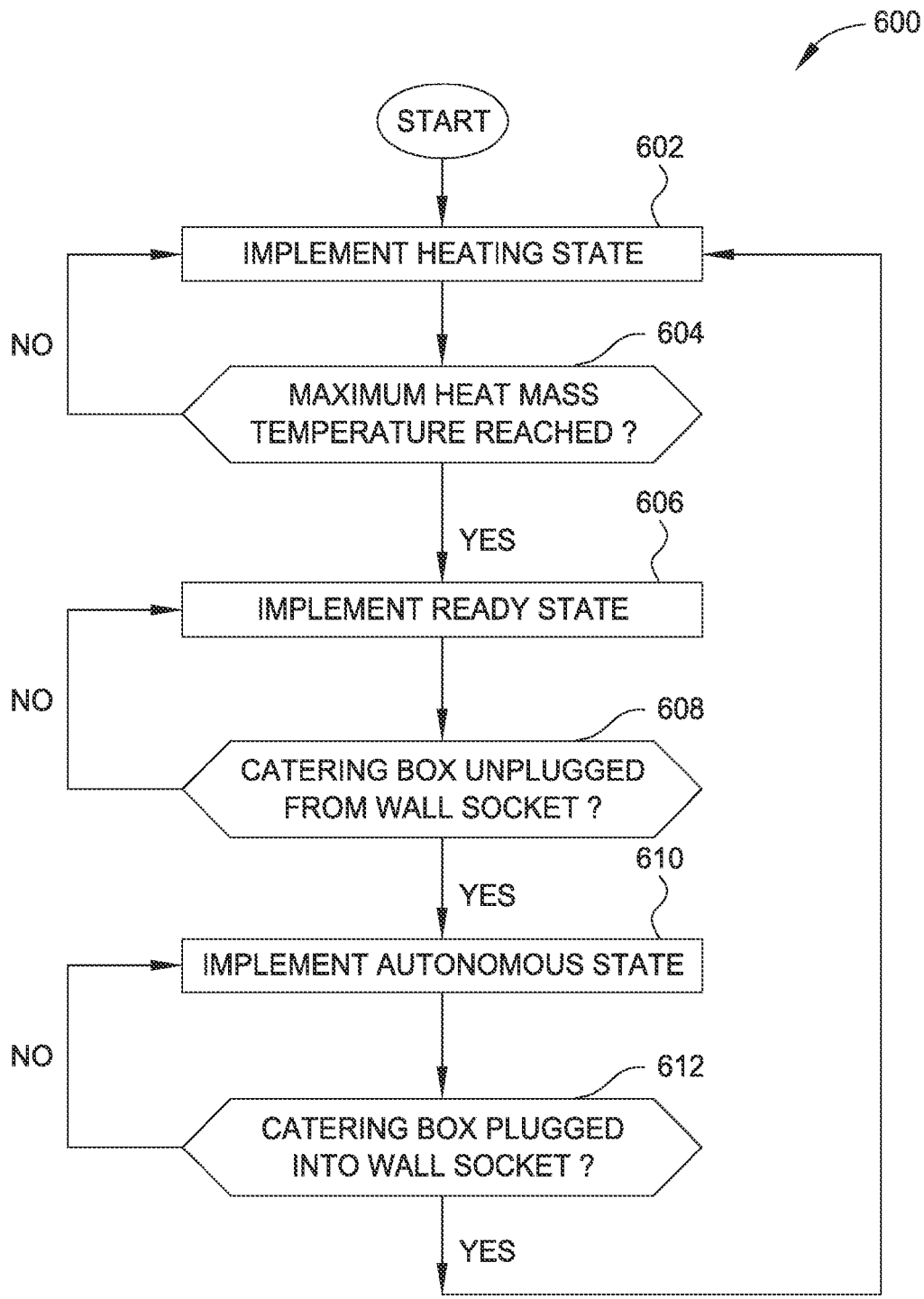
FIG. 6 is a flow diagram of method steps for transitioning between the different operating states of the catering box of FIGS. 1A-1B, according to one embodiment of the present invention.

Without microcontroller 150 maintaining specific humidity in this fashion, humidity levels within catering box 100 would rise to very high levels, as illustrated for exemplary purposes by open-loop humidity 570. Open-loop humidity 570 reflects the potential specific humidity levels within catering box 100 without the closed-loop, active climate control furnished by microcontroller 150. Such excessive moisture within catering box 100 may induce sogginess in bread-containing food items. However, microcontroller 150 potentially avoids this outcome by maintaining specific humidity 560 in the fashion shown Processes for Controlling Catering Box Climate FIG. 6 is a flow diagram of method steps for transitioning between the different operating states of the catering box of FIGS. 1A-1B, according to one embodiment of the present invention. Although the method steps are described in conjunction with the systems of FIG. 1-5C, persons skilled in the art will understand that any system configured to perform the method steps, in any order, is within the scope of the present invention.

As shown, a method 600 begins at step 602, wherein microcontroller 150 within catering box 100 implements heating state 410. Microcontroller 150 implements heating state 410 when plugged into a wall socket. In performing step 602, microcontroller 150 places both hot plate 110 and exhaust fan 160 into an "on" state, thereby causing hot plate 110 to continuously increase the temperature of heat mass 120 and exhaust fan 160 to continuously remove humid air from within catering box 100. Food items may be loaded into catering box 100 when microcontroller 150 implements heating state 410 at step 602. Microcontroller 150 repeats step 602 until determining, at step 604, that the temperature of heat mass 120 has reached the maximum temperature. The method 600 then proceeds to step 606.

At step 606, microcontroller 150 implements ready state 420. In doing so, microcontroller 150 causes hot plate 110 to implement a maintenance cycle by cycling on and off periodically. In this fashion, hot plate 110 sustains the temperature of heat mass 120 near a certain desired temperature. In like fashion, microcontroller 150 causes exhaust fan 160 to cycle on and of, thereby maintaining the specific humidity level within catering box 100 between certain upper and lower boundaries. Food items may also be loaded into catering box 100 when microcontroller 150 implements heating state 410 at step 602. Microcontroller 150 repeats step 606 until determining, at step 608, that catering box 100 has been unplugged from the wall socket (presumably for transport purposes). The method 600 then proceeds to step 610.

At step 610, microcontroller 150 implements autonomous state 430 by deactivating hot plate 110 and causing exhaust fan 160 to continue to cycle between on and off states, thereby controlling the specific humidity within catering box 100. Similar to ready state 420, in autonomous state 430, microcontroller 150 maintains the specific humidity level within catering box 100 between certain upper and lower boundaries. Food items may be loaded into catering box 100 during autonomous state, although loading during autonomous state 430 is typically avoided since opening catering box 100 would allow heat stored therein to escape. Microcontroller 150 repeats step 610 until determining, at step 612, that catering box 100 has been plugged into a wall socket. The method 600 then returns to step 602 and proceeds as described above.

In performing the method 600, microcontroller 150 may also selectively engage and disengage circulation fan 132 and/or modulate the operation of that fan, e.g. to adjust circulation 134. For example, microcontroller 150 could set circulation fan 132 to a maximum speed during heating state 410, then reduce that speed to a nominal speed during ready state 420. Microcontroller 150 could also select another speed for circulation fan 132 during autonomous state 430.

Figure 7:
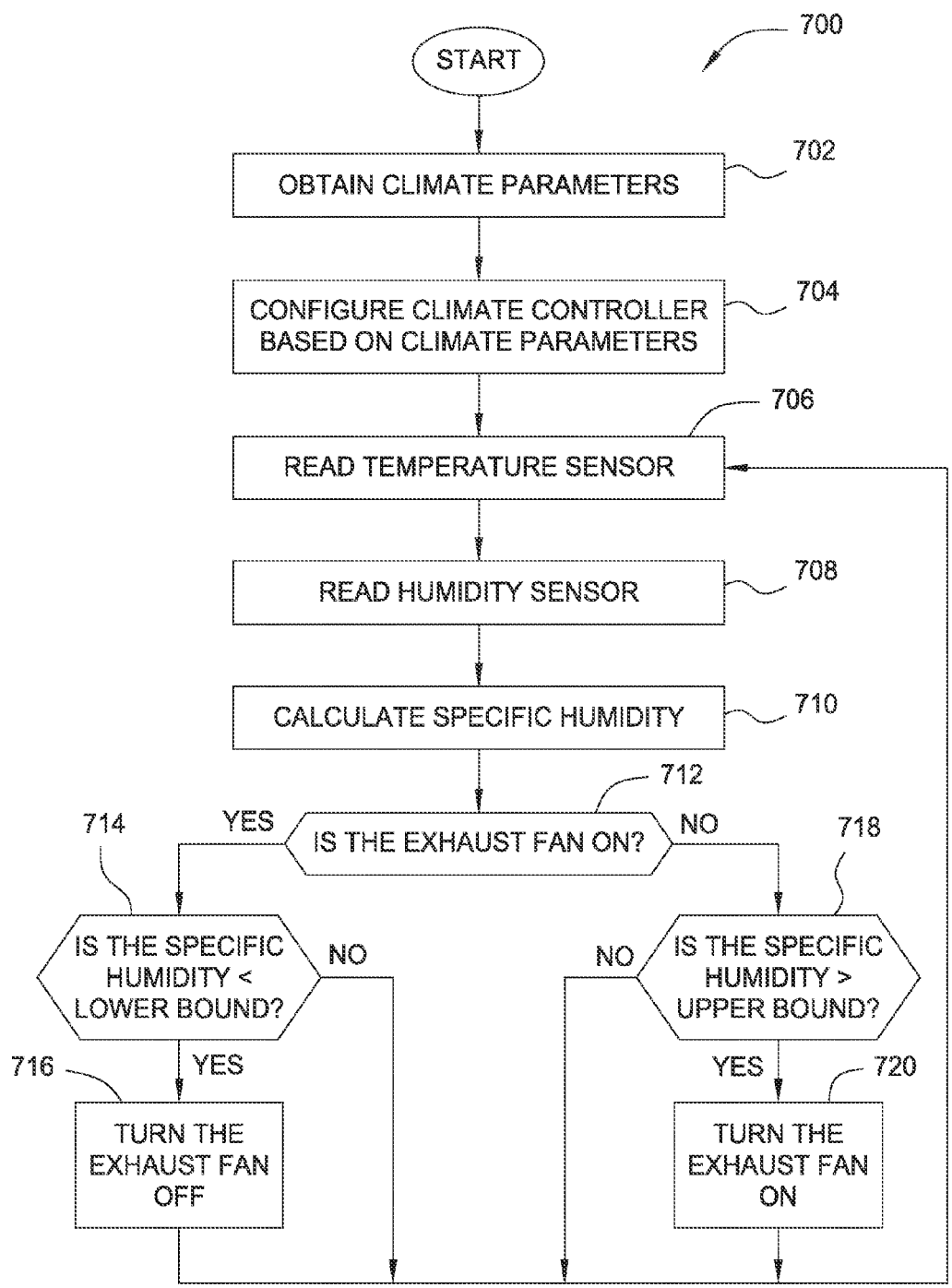
FIG. 7 is a flow diagram of method steps for controlling the climate within the catering box of FIGS. 1A-1B, according to one embodiment of the present invention.

When microcontroller 150 performs steps 606 and steps 610 of the method 600, thereby implementing ready state 420 and autonomous state 430, respectively, microcontroller 150 issues control signals to exhaust fan 160 to maintain a desired specific humidity level within catering box 100. FIG. 7, described below in stepwise fashion, reflects one approach to controlling exhaust fan 160.

FIG. 7 is a flow diagram of method steps for controlling the climate within the catering box of FIGS. 1A-1B, according to one embodiment of the present invention. Although the method steps are described in conjunction with the systems of FIG. 1-5C, persons skilled in the art will understand that any system configured to perform the method steps, in any order, is within the scope of the present invention.

As shown, a method 700 begins at step 702, wherein microcontroller 150 obtains climate parameters than reflect the desired climate for catering box 100. The climate parameters obtained at step 702 could include lower and upper bounds for specific humidity, a desired temperature level, a target measure of convective heating, and so forth. In one embodiment, microcontroller 150 may be configured to dynamically compute climate parameters, including lower and upper bounds for specific humidity, based on the type of food items stored in catering box 100.

Microcontroller 150 could, for example, interact with a kitchen management system (KMS) to acquire details of a catering order, parse the order to identify individual food items to be stored within catering box 100, determine a set of attributes associated with each such item, and then compute the climate parameters based on those attributes. For a given food item, the attributes could be, e.g., an amount of humidity contributed by that item, an amount of bread associated with the item, a desired temperature for the item, and so forth. Since each such item may have different values for the associated attributes, microcontroller 150 may determine climate parameters to optimally account for the range of different values.

At step 704, microcontroller 150 configures hardware or software associated with microcontroller 150 based on those climate parameters. Microcontroller 150 could, for example, write the climate parameters to registers within microcontroller 150, or adjust variables associated with a software application executed by microcontroller 150, among other possibilities.

At step 706, microcontroller 150 reads a temperature sensor included within sensor array 152. At step 708, microcontroller 150 reads a humidity sensor included within sensor array 152. At step 710, microcontroller 150 calculates a specific humidity level within catering box 100. At step 712, microcontroller 150 determines whether exhaust fan 160 is currently engaged. In doing so, a software variable may be read that reflects the engagement state of exhaust fan 160.

If microcontroller 150 determines at step 712 that exhaust fan 160 is currently engaged, then the method 700 proceeds to step 714, where microcontroller 150 determines whether the specific humidity level is less than a lower bound specified in the climate parameters. Nominally, the lower bound may be 3%, although that value may change depending on the type of food items stored in catering box 100. If microcontroller 150 determines at step 714 that the specific humidity level is, in fact, less than the lower bound, the specific humidity level within catering box 100 may be too low, and so the method 700 then proceeds to step 716. At step 716, microcontroller 150 disengages exhaust fan 160 in order to retain humid air within catering box 100. The method 700 then returns to step 706 and proceeds as described above. If microcontroller 150 determines at step 714 that the specific humidity level is not less than the lower bound, then the method 700 returns to step 706 without changing the state of exhaust fan 160.

Returning to step 712, if microcontroller 150 determines at step 712 that exhaust fan 160 is not engaged, then the method 700 proceeds to step 718, where microcontroller 150 determines whether the specific humidity level is greater than an upper bound specified in the climate parameters. Nominally, the upper bound may be 4%, although that value may change depending on the type of food items stored in catering box 100, as mentioned above. If microcontroller 150 determines at step 718 that the specific humidity level is, in fact, greater than the upper bound, the specific humidity level within catering box 100 may be too high, and so the method 700 then proceeds to step 720. At step 720, microcontroller 150 engages exhaust fan 160 in order to draw humid air out of catering box 100. The method 700 then returns to step 706 and proceeds as described above. If microcontroller 150 determines at step 718 that the specific humidity level is not greater than the lower bound, then the method 700 returns to step 706 without changing the state of exhaust fan 160.

In sum, a catering box with active climate control is configured to transport "delicate" foods (i.e., hot food items that include bread), such as grilled cheese sandwiches, hot dogs, and hamburgers, without inducing substantial sogginess in the bread of those food items. The catering box includes a heat mass configured to retain heat generated by a hot plate and to then radiate that heat, during transport, after the hot plate has been disconnected from a power source. In addition, the catering box includes an exhaust fan that actively controls internal specific humidity levels in order to prevent moisture from settling within the bread of stored food items. A microcontroller within the catering box monitors temperature and absolute humidity levels, computes the current specific humidity level, and then selectively engages or disengages the exhaust fan in response. With his approach, the catering box is capable of maintaining a specific range of internal specific humidity levels, thereby limiting the degree to which humidity settles within the bread of delicate food items stored within.

At least one advantage of the systems and techniques set forth herein is that delicate food items may be transported without introducing excessive moisture into the bread of such items. Thus, items such as melts, hamburgers, hot dogs, and so forth may be prepared, transported, and then consumed at a later time, without a significant reduction in quality. In addition, the heat mass included in the catering box provides a relatively steady radiant heat source without the need for a power source, thereby allowing hot food items to maintain a higher temperature during transport, over a longer period of time, compared to conventional insulated catering boxes.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A food storage container, comprising:
   a humidity sensor configured to measure a current humidity level within the storage container;
   an exhaust fan configured to remove air from the food storage container;
   a heating element coupled to a heat mass; and
   a microcontroller configured to:
      cause the heating element to heat the heat mass during a first period of time;
      cause the heating element to cycle on and off during a second period of time;
      cause the exhaust fan to engage and disengage during the second period of time to control a humidity level within the food storage container; and
      cause the heating element to remain deactivated during a third period of time; and
      cause the exhaust fan to periodically engage and disengage during the third period of time to control the humidity level within the food storage container,
   wherein, during both the second period of time and the third period of time, the microcontroller is configured to control the humidity level within the food storage container by:
      computing a humidity value based on sensor data that reflects the humidity level within the food storage container;
      determining that the humidity value exceeds an upper humidity boundary; and
      engaging the exhaust fan to remove air from the food storage container until the humidity value reaches a lower humidity boundary.

2. The food storage container of claim 1, wherein,
   during both the second period of time and the third period of time, the microcontroller is further configured to control the humidity level within the food storage container by:
      determining that the humidity value has fallen below the lower humidity boundary; and disengaging the exhaust fan to allow air to accumulate within the food storage container.

3. The food storage container of claim 1, further comprising a circulation fan configured to induce a first circulation within the food storage container to circulate air across the heat mass.

4. The food storage container of claim 1, further comprising a temperature sensor configured to measure a current temperature level within the food storage container.

5. The food storage container of claim 1, wherein the heating element and the heat mass are integrated as a single element.

6. The food storage container of claim 1, wherein the food storage container is insulated.

7. A non-transitory computer-readable medium storing program instructions that, when executed by a processor included in a food storage container, cause the processor to perform the steps of:
 causing the food storage container to enter a heating state during which a heating element included within the food storage container heats a heat mass also included in the food storage container;
 causing the food storage container to enter a ready state during which the heating element cycles on and off, and an exhaust fan engages and disengages to maintain a humidity level within the food storage container between an upper humidity boundary and a lower humidity boundary; and
 causing the food storage container to enter an autonomous state during which the heating element is off, heat is provided by the heat mass, and the exhaust fan periodically engages and disengages to maintain the humidity level within the food storage container between the upper humidity boundary and the lower humidity boundary.

8. The non-transitory computer-readable medium of claim 7, further comprising causing the food storage container to transition from the heating state to the ready state when a current temperature level within the food storage container has reached a first threshold value.

9. The non-transitory computer-readable medium of claim 8, further comprising causing the food storage container to transition from the ready state to the autonomous state when the food storage container is decoupled from an external power source.

10. A computer-implemented method, comprising:
 causing a catering box to enter a heating state during which a heating element included within the catering box heats a heat mass also included in the catering box;
 causing the catering box to enter a ready state during which the heating element cycles on and off, and an exhaust fan engages and disengages to maintain a humidity level within the catering box between an upper humidity boundary and a lower humidity boundary; and
 causing the catering box to enter an autonomous state during which the heating element is off, heat is provided by the heat mass, and the exhaust fan periodically engages and disengages to maintain the humidity level within the catering box between the upper humidity boundary and the lower humidity boundary,
 wherein, during both the ready state and the autonomous state the humidity level is maintained within the catering box by:
 computing a humidity value based on sensor data that reflects the humidity level within the catering box;
 determining that the humidity value exceeds the upper humidity boundary; and
 engaging an exhaust fan configured to remove air from the catering box to reduce the humidity level within the catering box until the humidity value reaches the lower humidity boundary.

11. The computer-implemented method of claim 10, wherein, during both the ready state and the autonomous state the humidity level is further maintained within the catering box by
 determining that the humidity value has fallen below the lower humidity boundary; and
 disengaging the exhaust fan to allow air to accumulate within the catering box to increase the humidity level within the catering box.

12. The computer-implemented method of claim 11, wherein the humidity value comprises a specific humidity value that reflects a ratio between water vapor mass per unit area and air mass per unit area.

13. The computer-implemented method of claim 10, further comprising causing the catering box to transition from the heating state to the ready state when a current temperature level within the catering box has reached a first threshold value.

14. The computer-implemented method of claim 10, further comprising causing the catering box to transition from the ready state to the autonomous state when the catering box is decoupled from an external power source.

15. The computer-implemented method of claim 14, further comprising causing the catering box to transition from the autonomous state back to the heating state when the catering box is re-coupled to an external power source.

16. The computer-implemented method of claim 10, further comprising causing a circulation fan to induce a first circulation within the catering box to circulate air across a heat mass included within the catering box.

17. The computer-implemented method of claim 10, wherein the catering box comprises a storage container.

18. The computer-implemented method of claim 17, wherein the storage container comprises an insulated storage container.

* * * * *

UNITED STATES PATENT AND TRADEMARK OFFICE
CERTIFICATE OF CORRECTION

PATENT NO. : 9,492,035 B2  
APPLICATION NO. : 14/880152  
DATED : November 15, 2016  
INVENTOR(S) : Michael Pavel et al.

Page 1 of 1

It is certified that error appears in the above-identified patent and that said Letters Patent is hereby corrected as shown below:

On the Title Page

(71) Applicant:
Please delete "Fish Six RC" and insert --Fish Six RC dba THE MELT--;

(73) Assignee:
Please delete "San Fancisco" and insert --San Francisco--;

(57) Abstract:
Line 15, please delete "his" and insert --this--.

Signed and Sealed this  
Fourth Day of April, 2017

Michelle K. Lee  
*Director of the United States Patent and Trademark Office*